Aug. 17, 1943. J. H. WIGGINS Re. 22,367
GAUGING APPARATUS FOR LIQUID CONTAINERS
Original Filed March 2, 1940 2 Sheets-Sheet 1
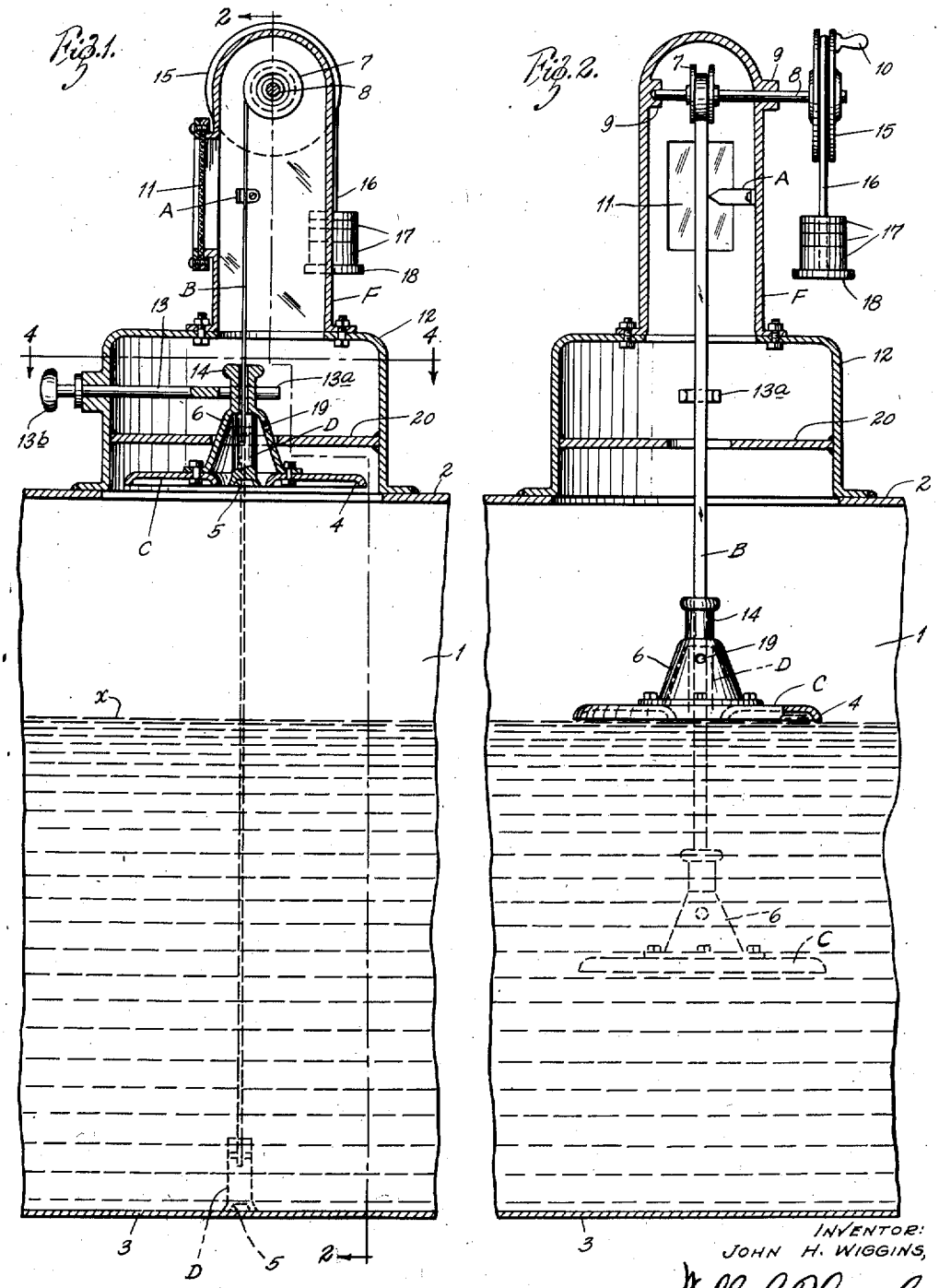
INVENTOR:
JOHN H. WIGGINS,
BY Wells L. Church
ATTORNEY.

GAUGING APPARATUS FOR LIQUID CONTAINERS
Original Filed March 2, 1940 2 Sheets-Sheet 2
Fig. 4.
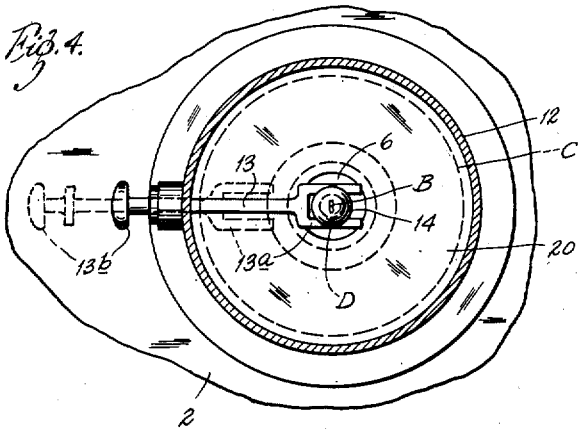
Fig. 3.
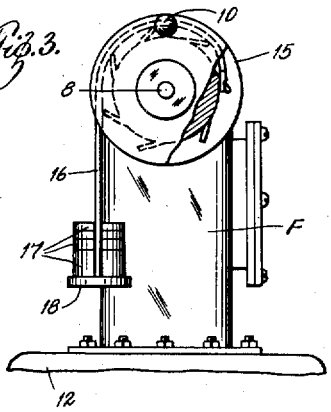
Fig. 6.
Fig. 5.
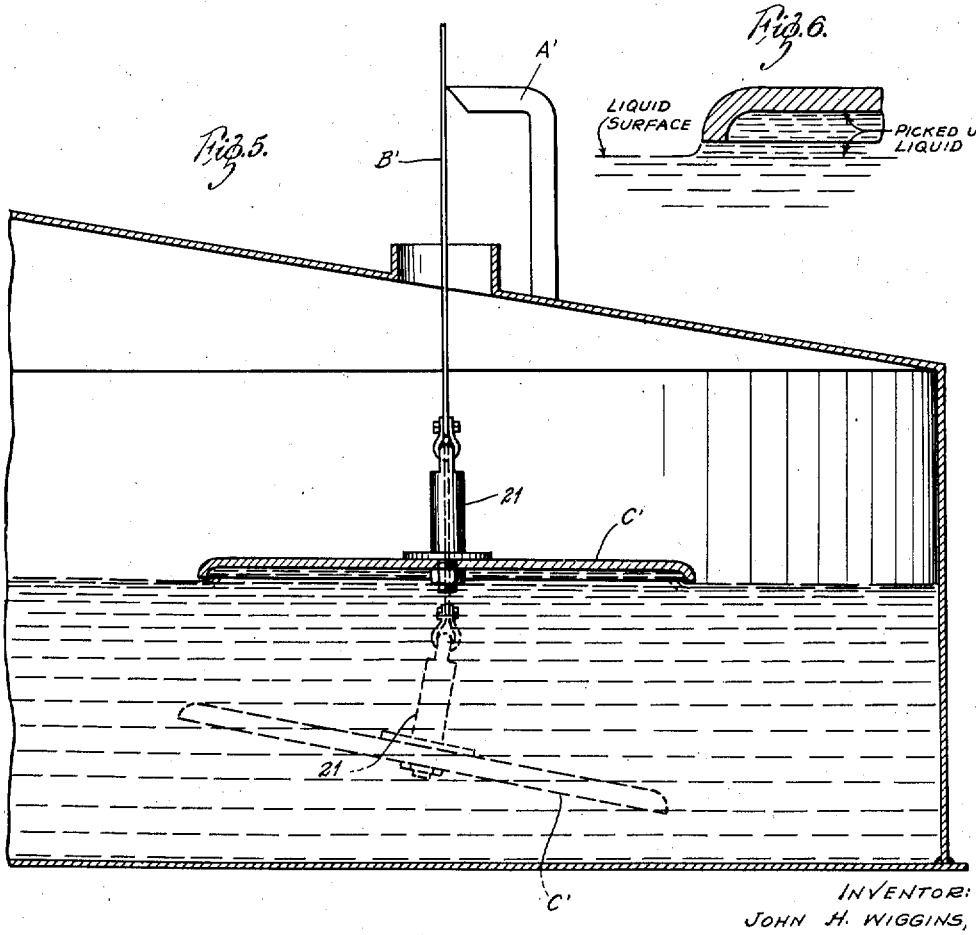
INVENTOR:
JOHN H. WIGGINS,
BY Wells R. Church
ATTORNEY.

Reissued Aug. 17, 1943

Re. 22,367

UNITED STATES PATENT OFFICE 22,367

GAUGING APPARATUS FOR LIQUID CONTAINERS

John H. Wiggins, Chicago, Ill.

Original No. 2,282,774, dated May 12, 1942, Serial No. 321,827, March 2, 1940. Application for reissue May 3, 1943, Serial No. 485,544

17 Claims. (Cl. 73—309)

This invention relates to apparatus and devices of the kind that are used to gauge liquid containers, my present application being a continuation, in part, of my pending application for patent Serial No. 242,690, filed November 28, 1938 (now U. S. Patent No. 2,282,771, dated May 12, 1942), which discloses a method and apparatus for gauging liquid confined in a tank that involves the procedure of using a measuring element to measure the distance between a datum point and the surface of the liquid in the tank, and then subtracting the number representing said distance, from a second number representing the distance between said datum point and the bottom of the tank, so as to ascertain the depth of the body of liquid in the tank.

The apparatus which constitutes the subject-matter of my present invention is similar in general design and principle of operation, to the apparatus disclosed in my said pending application, but it comprises some new features and some new details of construction that simplify and improve the use of said method and the operation of said apparatus. One new feature of my present invention consists in temporarily attaching the measuring element to the liquid during the operation of measuring the distance between the datum point and the surface of the liquid, by means of a telltale or anchoring device, which is of such design or construction that when it reaches a certain position relative to the surface of the liquid, it will create a suction or vacuum and pick up liquid, with the result that the telltale will be subjected to an additional weight or load that is made use of to assist, cause or contribute to the proper setting or positioning of the measuring element relative to the surface of the liquid. The particular shape, form or type of construction of said telltale or anchoring device is immaterial, so long as it is designed so that when the measuring element is being manipulated to arrange the telltale at the surface of the liquid, the extra weight of the liquid picked up by the telltale when the telltale starts to move upwardly away from the liquid surface, will, in effect, temporarily increase the weight of the telltale, and in this way, subject the telltale to the action of a counteracting force that is utilized to assist or cause the telltale to be temporarily attached to the surface of the liquid, as disclosed in my said pending application, and as hereinafter explained more in detail. The telltale or anchoring device for the measuring element may consist of a substantially cone-shaped, hollow device attached to the lower end of the measuring element, or it may consist of a relatively light-weight member of considerable area, of the general design described in my said pending application for patent, modified or distinguished in construction from the telltale illustrated in said prior application, in that it is provided with a depending flange or downwardly-turned portion at its peripheral edge. I prefer to construct the telltale or anchoring device in the manner last referred to, i. e., in the form of a relatively light-weight, substantially flat disk of considerable area, provided with a turned-down peripheral portion, because with a device of such shape or form, there is (1) less vertical movement for a given increase in weight; (2) there is practical certainty that all of the entrapped air on the interior or on the underside of said device will be spilled out when the device is tipped just a little in the operation of submerging it in the liquid; and (3) such a device makes use of the surface tension of the liquid, or the adhesion of the liquid to the device, in addition to picking up liquid by suction, to temporarily increase the weight of the telltale when it is right at the surface of the liquid. The above mentioned characteristics of the telltale or anchoring device for the measuring element, contribute considerably to the accuracy of the apparatus and to the ease of operating the same.

Another new feature of my present invention consists of a measuring element, a telltale or anchoring device, and a plumb bob, combined in such a manner as to produce a gauging apparatus that is inexpensive, compact and easy to operate, due to the fact that the same mesuring element is used to determine the distance between the datum point and the bottom of the tank, and also to determine the distance between the datum point and the surface of the liquid, the act of withdrawing the plumb bob from the liquid and restoring it to its normal inactive position causing the telltale to be simultaneously restored to its normal inactive position. When the apparatus is not in use, the plumb bob and telltale are arranged in substantially nested relationship, inside of a relatively small housing mounted on the top or roof of the tank. The datum point may either be arranged on the exterior of said housing, and the measuring eement led outwardly from said housing through an opening therein, or the datum point can be located inside of the housing and the measuring element can be wound onto a reel located inside of the housing and operable from the exterior of the housing. When constructed in the manner last referred to, the housing is, of course, provided with a glass covered sight opening through which the user can observe the datum point and the measuring element.

In order to facilitate the use of the apparatus and enable it is to be operated successfully by a person possessed of no particular skill, training or prior experience in tank gauging, the measuring element is combined with an operating mechanism that comprises an adjustable or variable counterweighting means of novel construction, which is adapted to be manipulated by the user so as to determine when the measuring element is in correct reading position, during the operation of measuring the distance between the datum point and the bottom of the tank, and also to cause the measuring element to be automatically set in correct position during the operation of measuring the distance between the datum point and the surface of the liquid.

Figure 1 of the drawings is a vertical sectional view of my improved gauging apparatus.

Figure 2 is a vertical longitudinal sectional view on the line 2—2 of Figure 1, but showing the position which the telltale assumes with relation to the surface of the liquid when the measuring element is set in correct reading position during the operation of measuring the distance between the datum point and the surface of the liquid.

Figure 3 is a detail view, illustrating how the counterweighting means is detachably combined with the operating shaft for the measuring element.

Figure 4 is a fragmentary horizontal sectional view, taken on the line 4—4 of Figure 1.

Figure 5 is a view for the purpose of illustrating or making it plain that a telltale or anchoring device of the particular kind herein disclosed is not limited to use with a plumb bob, but instead, is capable of use with any kind of a measuring element, such, for example, as a measuring element adapted to be held in the hand of the user, and designed to co-operate with a datum point arranged in the open, or, in other words, not inside of a gas-tight housing; and Figure 6 is an enlarged fragmentary sectional view, illustrating how the telltale functions.

In Figures 1 to 4, inclusive, of the drawings, 1 designates a container, such, for example, as a metal tank of the kind now used extensively for storing gasoline and other volatile liquids $x$, 2 designates the roof or top of said tank, and 3 designates the bottom of said tank. In using my improved gauging apparatus, the depth of the body of liquid $x$ in the tank is determined by subtracting a number representing the distance between the surface of said liquid and a datum point A, from a second number representing the distance between said datum point and the bottom of the tank. The method or procedure employed in determining the two numbers representing the distances above referred to, involves the step of arranging a measuring element B vertically between the datum point A and the surface of the liquid $x$, and causing the lower end of said measuring element to be temporarily attached or anchored to the surface of the liquid, thereby insuring that the lower end of the measuring element will be set in correct position with the surface of the liquid, i. e., in touching contact with the liquid, when the user reads the measuring element. If the measuring element consists of a flexible member, such as a metal tape, the temporary attachment of the lower end of the measuring element to the surface of the liquid imposes a tension on the measuring element and holds it taut, when the user exerts an upward pull on the measuring element and notes the numeral or other indicia thereon that aligns with or is positioned opposite to the datum point, in the operation of measuring the distance between the datum point and the surface of the liquid.

In the particular form of my invention herein disclosed, the measuring element B consists of a flexible metal tape marked in units of measurement, and the means used to temporarily attach the lower end of said measuring element to the liquid so as to set the measuring element in correct reading position, consists of a telltale or anchoring device C that, in effect, constitutes the theoretical end of the measuring element B, and which is of such design or construction that if the telltale B is submerged in the liquid and then drawn upwardly to the surface of the liquid by an upward pull exerted on the measuring element, said telltale will create a suction and pick up liquid, if the upward pull or force exerted on the measuring element is continued after the telltale has reached the surface of the liquid. In other words, if the telltale C is given an upward pull at a time when said telltale is located at the surface of the liquid $x$, the liquid picked up by the telltale or the suction created on the underside of the telltale when it starts to move upwardly away from the liquid, constitutes a weight, force or load that resists or opposes the upward movement of the measuring element, and which is made use of either to notify the user that the measuring element is set in correct reading position, or to automatically set the measuring element or arrest upward movement of same when the measuring element reaches correct reading position. As previously stated, the telltale or anchoring device above referred to may be constructed in the form of a hollow cone, or in the form of a substantially inverted cup-shaped member. The reason for constructing the telltale in this manner is to insure that when it is suspended above the surface of the liquid, with the bottom edge of the telltale touching the liquid or sealed by the liquid, there will be an air space on the underside of the telltale above the surface of the liquid. Naturally, the telltale must be combined with the measuring element in such a manner that said telltale will assume a level position, or will lie in a horizontal plane when it is performing its function.

I prefer to use a telltale consisting of a lightweight, substantially flat, disk-shaped member of substantial diameter, say, for example, from 18 to 20 inches in diameter, provided at its peripheral edge with a depending flange or downwardly-turned portion 4, said telltale being attached to or combined with the measuring element B in such a way that the lifting force will be in a vertical line at the geometrical center of the telltale. A telltale or anchoring device of the kind just described has the desirable characteristics and features of the telltale described in my said pending application for patent, i. e., the surface tension or the adhesion of the liquid, to the telltale, assists in temporarily attaching the telltale to the liquid, when the measuring element is being read, and it has the added advantage of making use of the liquid pulled up by the telltale when the measuring element is put under tension, or given an upward pull, to counteract said upward pull, and in effect, add to the weight of the telltale, or enhance or increase the counteracting force relied upon, either to notify the user when the measuring element is set in correct reading position, or to arrest the upward movement of the telltale, and thus automatically set the measuring element, when the theoretical end of the measuring element is in touching contact with the surface of the liquid, or is temporarily attached to the liquid by the telltale. Figure 6 clearly illustrates how the telltale functions.

If the distance between the datum point and the bottom 3 of the tank is not known, or if said distance is apt to vary, the user must measure said distance during the gauging operation. The apparatus herein illustrated is constructed so that the same measuring element B may be used to measure the distance between the datum point and the bottom of the tank and the distance between the datum point and the surface of the liquid. This desirable result is attained by attaching a plumb D to the measuring element B, and constructing the telltale C so that the measuring element leads upwardly through a center opening in said telltale. When the distance between the datum point and the bottom of the tank is being measured, the telltale is retained in an inactive position, wherein it does not interfere with the use of the measuring element and plumb bob, or the manipulation of said parts, but when it is desired to measure the distance between the datum point and the surface of the liquid, the telltale can be released and the measuring element and plumb bob thereafter used to support and actuate the telltale. As shown in the drawings, the plumb bob D is preferably of elongated form and is of the footed type, i. e., it is provided at its lower end with a rim, flange, or depending projections 5 that are adapted to rest upon the bottom 3 of the tank, when the distance between said tank bottom and the datum point A is being measured. The telltale C is provided with a center opening, within which the plumb bob D is positioned under certain conditions, and in the preferred form of my invention, the telltale C is provided on its top side with a saddle or tapered hollow part 6, designed or constructed so that when the telltale is supported by the plumb bob, the telltale can either assume a substantially level or horizontal position with the bottom edge of its peripheral flange 4 extending flush with the bottom edge of the depending rim 5 on the plumb bob, or it can rock relatively to the plumb bob and assume an inclined or tilted position.

In a gauging apparatus embodying my invention, the measuring element B may be grasped by the hand of the user and manipulated during the operation of setting and reading said measuring element, as explained in my pending application for patent previously referred to, or the apparatus may be equipped with a means that acts to automatically set the measuring element in correct reading position, and which accordingly, overcomes the necessity of relying upon the sense of touch of the user to determine when the measuring element is in correct reading position.

In the form of my invention herein illustrated, a housing F is mounted on the roof 2 of the tank, and an operating reel 1 for the measuring element B is mounted inside of said housing F, said reel being rigidly attached to a horizontally-disposed shaft 8 rotatably mounted in leak-proof bearings 9 on said housing, and provided with an operating crank or arm 10, accessible from the exterior of the housing F. The measuring element B, which is attached to the reel 1, extends downwardly from said reel across or past a sight opening in the housing F covered with glass or other suitable transparent material 11, and the datum point A, previously referred to, consists of a hand or pointer arranged inside of the housing F in proximity to the measuring element B at such a point that said measuring element and datum point can be easily seen by the user through the glass covered sight opening in the housing. Normally, the plumb bob D and the telltale C are arranged in nested relationship inside of an enlarged portion 12 of the housing F, as shown in full lines in Figure 1, said parts being retained in this, their inactive position, by a means hereinafter described. When it is desired to gauge the tank, the user releases the plumb bob D, without, however, releasing the telltale C, and rotates the reel 7 in a direction to cause the plumb bob to descend to the bottom 3 of the tank, as shown in broken lines in Figure 1. When the plumb bob is in touching contact with the tank bottom and the measuring element B is stretched taut, the measuring element is then in correct reading position, and the numeral on said measuring element that aligns with or stands opposite to the datum point A, represents the distance between said datum point and the bottom of the tank. After this measurement has been taken, the user winds the measuring element onto the reel 7 to restore the plumb bob to nested relationship with the telltale, and subsequently releases the telltale and unwinds the measuring element, so as to lower the telltale into the liquid $x$. At such times, i. e., when the telltale is being submerged in the liquid, the telltale is supported by the plumb bob, and due to the way in which the telltale is mounted on the plumb bob, the telltale is free to rock relatively to the plumb bob and spill out any air that may tend to collect on the underside of the telltale when it is being submerged in the liquid.

Any suitable or preferred means may be used to maintain the plumb bob D and telltale C in nested relationship inside of the housing F and hold said parts in their normal inactive position. For example, a shiftable supporting device 13 can be mounted in the enlarged portion 12 of the housing F, at such a point that after the telltale has been drawn upwardly into said housing, the device 13 can be moved into a position where a bifurcated portion 13[a] thereon will straddle and engage a knob 14 on the saddle 6 of the telltale, provided with a slot up through which the measuring element B extends. To release the telltale C, the user grasps the handle 13[b] of the device 13, and pulls said device outwardly, or to the left, looking at Figure 1, so as to disengage the bifurcated portion 13[a] from the knob 14, thus releasing the telltale and permitting it to be lowered into the liquid. Obviously, various other types and kinds of devices may be used to retain the telltale in its inactive position, or to support said telltale at a point above the liquid when said telltale is not in use. The means that I prefer to use for retaining the plumb bob D in nested relationship with the telltale, consists of a counterweighting means that is adapted to be applied to or attached to the operating shaft 8 for the measuring element, after the plumb bob D has been drawn upwardly into the housing F.

Preferably, said counterweighting means is so constructed that it can be changed or modified to vary the load or pull it exerts on the measuring element, and in addition to serving as a retaining means that holds the plumb bob in its inactive position, said counterweighting means is adapted to be used to set or assist in the correct setting, of the measuring element during both measuring operations. In the particular form of my invention herein illustrated the portion of the operating shaft 8 that extends outside of the housing F, has a pronged wheel or pulley 15 secured to same, and the counterweighting means consists of a cable 16, and a plurality of weights 17 that constitute a variable or adjustable load which is adapted to be detachably connected to the pronged wheel 15. After the plumb bob has been drawn upwardly into the housing F, the counterweighting means, consisting of the cable 16 and one or more of the weights 17, is attached to the pronged wheel 15 so as to exert a pressure on the shaft 8 in a direction to overcome the possibility of said shaft turning in a direction to permit the plumb bob to descend. During the gauging operation, when the plumb bob is being arranged in touching contact with the bottom of the tank, and when the telltale is being arranged in touching contact with the surface of the liquid, the said counterweighting means is also preferably used to assist or effect the setting of the measuring element in correct reading position. While I have herein illustrated a counterweighting means consisting of a cable 16, a plurality of weights 17, and a pan or equivalent device 18 on the end of said cable that is adapted to support said weights, I wish it to be understood that various other types and kinds of counterweighting or weighing means could be employed, without departing from my invention.

Normally, the plumb bob D and the telltale C are maintained in nested relationship in the housing F, as shown in full lines in Figure 1. At such times the device 13 supports or sustains the telltale, and the counterweighting means, consisting of the cable 16 and one or more of the weights 17, is suspended from the pulley or pronged wheel 15 of the operating shaft, so as to hold up the plumb bob and maintain it in nested relationship with the telltale. To gauge the tank the counterweight assembly is disengaged from the pronged wheel 15, and the shaft 3 is rotated in a direction to unwind the measuring element B and cause the plumb bob to move downwardly to the bottom of the tank. Then enough weights 17 are added to the pan 18 of the counterweighting mechanism to balance the plumb bob and ascertain the weight of same. Thereafter, sufficient weights are removed from the pan of the counterweighting means to make the counterweighting means of less weight than the plumb bob when the plumb bob is submerged in the liquid. For example, the counterweighting means can be so adjusted or regulated that when the user releases the handle of the operating shaft 8, the measuring element will move automatically downwardly through the liquid, so as to automatically set the plumb bob in a position wherein it exerts a pressure of, say, 1 pound on the bottom of the tank, and the measuring element B will be maintained under a certain approximate tension, say, for example, a tension of 2 pounds. While thus counterweighted, the measuring element B is read at the datum point A, so as to ascertain the distance between said datum point and bottom of the tank. The next step in the operation is to rotate the operating shaft 8 in the opposite direction, so as to wind the measuring element onto the reel 7 to restore the plumb bob to nested relationship with the telltale. Thereafter, the retaining device 13 is disengaged from the knob 14 on the saddle of the telltale, which operation causes the telltale to be released. The entire assembly, consisting of the plumb bob and telltale, is then lowered slightly by unwinding the measuring element B from the reel and the variable counterweighting means is again hooked onto the pronged wheel 15 and adjusted or manipulated so as to ascertain the weight of the telltale assembly when said assembly is in the air or not submerged in the liquid. At this time the counterweighting means balances the telltale assembly, and the next step is to manipulate or adjust the counterweighting means, so as to increase the weight of same slightly above the weight of the telltale assembly, for example, an excess weight of, say, one-half pound. Thereafter, the user actuates the operating shaft 8 so as to submerge the telltale in the liquid, the unwinding of the measuring element being continued so as to submerge the telltale C, or depress it three or four inches below the surface of the liquid. Due to the fact that the saddle 6 of the telltale is free to rock on the upper end of the plumb bob, the telltale is free to tip or assume an angular position as it sinks into the liquid, and consequently, any entrapped air on the under side of the telltale will spill out by the time the telltale settles down on the plumb bob with a gentle jerk that is felt by the hand of the user, which grasps the operating handle 10. If the user now releases the operating handle, the measuring element will start to move upwardly slowly until the telltale C reaches the surface of the liquid, at which point, due to liquid picked up by the telltale, plus the force of the surface tension of the liquid on the telltale, the measuring element will come to rest with its theoretical end (the telltale C) in touching contact with the surface of the liquid, it being, of course, understood that the telltale is disposed in a horizontal plane, parallel to the surface of the liquid. The measuring element is now arranged in correct reading position, and consequently, the user only has to note the particular numeral on the measuring element that stands opposite to the datum point A to ascertain the distance, in units of measurement, between the datum point and the surface of the liquid. The number representing the distance between the datum point and the surface of the liquid is then subtracted from the number representing the distance between the datum point and the bottom of the tank, to determine the depth of the body of liquid. After the measurements have been taken, the counterweighting means is disengaged from the operating shaft 8, and the reel 7 is rotated in a direction to withdraw the plumb bob D from the liquid, which operation causes the telltale to be withdrawn from the liquid and arranged in nested relationship with the plumb bob, inside of the enlarged lower end portion of the housing F. The retaining means for the telltale C, herein represented by the shiftable device 13, is then re-engaged with the telltale, so as to sustain the weight of the telltale and retain it in an inactive position inside of the housing F, and the counterweighting means is thereafter hung onto the pronged wheel 15, so as to securely hold the plumb bob in its inactive position, in nested relationship with the telltale. Preferably, the tapered portion 6 on the telltale, which constitutes the saddle that is used to support the telltale on the plumb bob, is provided with a hole 19 that admits air or gas to the interior of said saddle, when the telltale assembly is pulled out of the liquid. Usually, the enlarged portion 12 of the housing F will be provided with a horizontally-disposed stop device or positioning device 20, provided with a center opening up through which the saddle 6 on the telltale projects when the telltale is in its inactive position inside of the housing F.

While the variable counterweighting means above described contributes to the accuracy and ease of operation of the apparatus, it is not absolutely essential that said counterweighting means be employed. Instead, the user can depend upon his sense of touch to arrange the plumb bob in touching contact with the bottom of the tank, and to arrange the telltale in touching contact with the surface of the liquid when setting the measuring element in correct reading position, during the operation of measuring the distance between the datum point and the bottom of the tank, and during the operation of measuring the distance between the datum point and the surface of the liquid. However, I prefer to equip the apparatus with such a variable counterweighting means as it automatically sets the measuring element in correct reading position, and it is easy to adjust or manipulate so as to insure that the measuring element will move automatically downwardly through the liquid when the distance between the datum point and the bottom of the tank is being measured, and will move automatically upwardly through the liquid when the distance between the datum point and the surface of the liquid is being measured. As explained in my pending application for patent previously referred to, the datum point can be arranged at any desired point outside of the liquid, either above the liquid, or at a point a considerable distance away from the liquid.

I have found that when the plumb bob is combined with the telltale so as to be operated through the center of the telltale, as herein illustrated and described, I produce a compact gauging apparatus that is inexpensive to manufacture and easy to combine with an operating shaft on the roof of the tank that holds the liquid to be gauged, but I wish it to be understood that so far as the telltale per se is concerned, i. e., a telltale or anchoring device of substantially inverted cup shape, or made in the form of a hollow cone-shaped member, it is immaterial how said telltale is combined with the measuring element, so long as said telltale is capable of assuming a level position, or occupying a position in a horizontal plane, when it is performing its function. Accordingly, in Figure 5 of the drawings I have shown a telltale C′ embodying my present invention, provided at its center with an upwardly-projecting spindle 21 swingingly mounted on or pivotally attached to the lower end of a measuring element B′. Said measuring element can either be grasped directly by the hand of the user and manipulated during the measuring operations, or said measuring element can be attached to an operating shaft that the user rotates to wind and unwind the measuring element. As shown in Figure 5, the datum point A′ can be arranged in the open, instead of on the interior of a housing, mounted on the roof of the tank. In an apparatus of the kind shown in Figure 5, the telltale C′ is disconnected from the measuring element and replaced by a plumb bob, in the operation of measuring the distance between the datum point and the bottom of the tank.

Having thus described my invention, what I claim as new and desire to secure by Letters Patent is:

1. An apparatus for gauging liquid confined in a container, comprising a datum point located outside of the liquid, a measuring element adapted to be arranged between said datum point and the surface of the liquid to measure the distance between the liquid surface and the datum point, and a device at the lower end of the measuring element that is adapted to be submerged in the liquid and drawn upwardly to the surface of the liquid, said device being substantially inverted cup-shaped, whereby an attempt to pull said deviue upwardly after it has reached the surface of the liquid, will create a counteracting force or load on the measuring element that is employed to assist, cause, or contribute to the setting of the measuring element in correct reading position.

2. An apparatus for gauging liquid confined in a container, comprising a datum point located outside of the liquid, a measuring element adapted to be arranged between said datum point and the surface of the liquid to measure the distance between the liquid surface and the datum point, and a device at the lower end of the measuring element that is adapted to be submerged in the liquid and drawn upwardly to the surface of the liquid, said device consisting of a substantially flat member provided at its peripheral edge with a downwardly-turned portion, and attached to the measuring element so as to tend to assume a horizontal position.

3. A device for gauging liquid confined in a container, consisting of a flexible tape and a substantially inverted, cup-shaped member suspended from the lower end of said measuring element and adapted to be submerged in the liquid and then drawn upwardly to the surface of the liquid to function as a means that detachably connects the measuring element to the surface of the liquid and holds said element under tension when said measuring element is read to ascertain the distance between the surface of the liquid and a datum point located outside of the liquid.

4. An apparatus for gauging liquid confined in a container, comprising a flexible measuring element adapted to be lowered into the liquid in the container, a datum point located outside of the liquid, a plumb bob attached to the measuring element for holding it taut during the operation of measuring the distance between the datum point and the bottom of the container, and a telltale supported by said plumb bob when the telltale is in use and adapted to be submerged in the liquid and drawn upwardly to the surface of the liquid in the operation of measuring the distance between the datum point and the surface of the liquid, said telltale being so constructed that if the measuring element is subjected to a slight upward pull when said telltale is located at approximately the surface of the liquid, the coaction of said telltale with the liquid will create a counteracting force that opposes the upward pull on the measuring element and which is utilized to assist or cause the measuring element to be set in correct reading position.

5. An apparatus of the kind described in claim 4, which comprises means for holding the telltale in an inactive position, out of contact with the liquid, when the distance between the datum point and the bottom of the container is being measured.

6. An apparatus of the kind described in claim 4, equipped with independently controlled means for normally holding both the plumb bob and telltale in an inactive position, out of contact with the liquid, the plumb bob and telltale being so constructed that the plumb bob may be used in making one measurement without disturbing the telltale, and may be used to suspend the telltale on the measuring element in making the other measurement.

7. An apparatus of the kind described in claim 4, provided with a housing arranged above the liquid that is adapted to receive the plumb bob and the telltale when the apparatus is not in use, the telltale and plumb bob being so constructed that they are arranged in nested relationship when positioned in said housing.

8. An apparatus of the kind described in claim 4, comprising a housing arranged above the liquid, and an operating mechanism carried by the housing for manipulating the measuring element, the datum point being positioned inside of said housing adjacent to a sight opening therein.

9. An apparatus of the kind described in claim 4, comprising a housing arranged above the liquid and adapted to receive the telltale and plumb bob when the apparatus is not in use, and an operating mechanism for the measuring element carried by the housing, the plumb bob being attached to the lower end of the measuring element and the telltale being so constructed that it is sustained by the plumb bob when the telltale is being submerged in the liquid and withdrawn from the liquid.

10. An apparatus for gauging liquid confined in a container, comprising a flexible measuring element that is adapted to be lowered into the liquid, a datum point located outside of the liquid, an operating mechanism for winding and unwinding said measuring element, a plumb bob attached to the measuring element and adapted to be used in the operation of measuring the distance between the datum point and the bottom of the container, a submergible telltale suspended from the measuring element and adapted to be used in the operation of measuring the distance between the datum point and the surface of the liquid, and a variable or adjustable means combined with said operating mechanism for automatically moving the measuring element upwardly through the liquid when the telltale is being set in proper position and for automatically controlling the movement of the measuring element downwardly through the liquid when the plumb bob is being set in proper position.

11. An apparatus for gauging liquid confined in a container, comprising a flexible measuring element, a datum point located outside of the liquid, a manually-actuated operating mechanism attached to said measuring element for winding and unwinding same to arrange said measuring element in proper relationship with the liquid to measure the distance between the datum point and the surface of the liquid, and also the distance between the datum point and the bottom of the container, and an adjustable or variable means adapted to be combined with said operating mechanism to automatically actuate the same so as to move and set the measuring element in correct reading position when the measurements are being made.

12. An apparatus for gauging liquid confined in a container, comprising a flexible measuring element adapted to be lowered into the liquid, a datum point located outside of the liquid, an operating mechanism for winding and unwinding said measuring element, said operating mechanism being capable of being actuated manually, a plumb bob attached to the lower end of the measuring element, a telltale adapted to be suspended from said measuring element by means of said plumb bob when said telltale is in use, and a variable or adjustable means adapted to be detachably combined with said operating mechanism to actuate the same automatically under certain conditions.

13. An apparatus for gauging liquid confined in a container, comprising a housing mounted on the roof of the container, a datum point located outside of the liquid, a flexible measuring element adapted to be stretched taut between the datum point and the liquid, an operating shaft mounted in the housing and provided with a reel to which said measuring element is attached, said shaft being capable of being actuated manually, and a variable or adjustable means adapted to be detachably connected to a portion of said shaft located on the exterior of the housing for operating said shaft automatically in the manner described.

14. An apparatus for gauging liquid confined in a tank, comprising a flexible tape, which, in the operation of gauging the liquid, is adapted to be arranged vertically within the tank in one position with its lower end set at the bottom of the tank and in another position with its lower end set to gauge the surface of the liquid, and an adjustable means for maintaining the tape under predetermined degrees of constant tension while said tape is being actuated to set it in its two different positions.

15. An apparatus for gauging liquid confined in a tank, comprising a plumb bob, a means for lowering the plumb bob to the bottom of the tank including a flexible tape to which the plumb bob is attached, and an adjustable means for retaining a predetermined minimum tension in the tape at the moment the plumb bob stops its downward motion by contacting the bottom of the tank.

16. An apparatus for gauging liquid in a storage tank, comprising a flexible element extending down into the tank, a member attached to the lower end of said flexible element and adapted to assume a gauging position in the tank, and an adjustable means for variably applying a predetermined tension to said flexible element while said member remains in a selected gauging position.

17. An apparatus for gauging liquid in a storage tank, comprising a flexible element extending down into the tank, a member attached to the lower end of said flexible element and adapted to assume a gauging position in the tank, and an adjustable means for applying and indicating a predetermined tension in sid flexible element, for controlling the setting of said member in a selected gauging position.

JOHN H. WIGGINS.